(12) United States Patent
Huin et al.

(10) Patent No.: US 9,584,747 B2
(45) Date of Patent: Feb. 28, 2017

(54) GAIN-RANGING CHARGE AMPLIFIER

(71) Applicant: Analog Devices, Inc., Norwood, MA (US)

(72) Inventors: Camille L. Huin, Cambridge, MA (US); Gary R. Carreau, Plaistow, NH (US)

(73) Assignee: Analog Devices, Inc., Norwood, MA (US)

(*) Notice: Subject to any disclaimer, the term of this patent is extended or adjusted under 35 U.S.C. 154(b) by 297 days.

(21) Appl. No.: 14/012,154

(22) Filed: Aug. 28, 2013

(65) Prior Publication Data

US 2014/0374570 A1 Dec. 25, 2014

Related U.S. Application Data

(60) Provisional application No. 61/837,875, filed on Jun. 21, 2013.

(51) Int. Cl.
*H04N 5/378* (2011.01)
*G01J 1/44* (2006.01)

(52) U.S. Cl.
CPC ............. *H04N 5/378* (2013.01); *G01J 1/44* (2013.01); *G01J 2001/4406* (2013.01)

(58) Field of Classification Search
CPC .... H04N 5/378; G01J 1/44; G01J 2001/4406; H04B 10/6931; H03F 8/08; H03F 3/087; H03F 3/082; H03G 3/3084

USPC .............. 250/208.1, 214 R, 214 A, 214 AG; 348/294–311; 257/290–292, 440
See application file for complete search history.

(56) References Cited

U.S. PATENT DOCUMENTS 7,639,073 B2    12/2009  Deng et al.
2014/0061472 A1*  3/2014  Salvestrini et al. ..... 250/339.02

FOREIGN PATENT DOCUMENTS

CN          101533636 A     9/2009
CN          101861697 A    10/2010
WO       WO-2010068423 A1   6/2010

* cited by examiner

*Primary Examiner* — Francis M Legasse, Jr.
(74) *Attorney, Agent, or Firm* — Schwegman Lundberg & Woessner, P.A.

(57) ABSTRACT

The system may include a pixel array, a selector, a sampler, and a converter. The pixel array may generate output signals representing radiation incident upon the pixel array. The selector may select one of the output signals. The sampler may sample the selected output signal. The converter may generate a digital signal based upon the selected output signal. The sampler may include a charge integrator that compensates for parasitic capacitance of the selector by selecting a first feedback capacitance to obtain a first sample, and after obtaining the first sample, selecting a second feedback capacitance to obtain a second sample. The first feedback capacitance may be greater than the second feedback capacitance.

23 Claims, 3 Drawing Sheets

100

GAIN-RANGING CHARGE AMPLIFIER

The present invention benefits from priority afforded by U.S. patent application Ser. No. 61/837,875, entitled "Gain-Ranging Charge Amplifier," filed Jun. 21, 2013, the disclosure of which is incorporated herein in its entirety.

BACKGROUND

A charge amplifier may be driven by an electrical signal source with capacitive nature such as a piezoelectric sensor, or a charge-coupled device (CCD). The charge amplifier may transfer the charge from a charge signal to a reference capacitor (also referred to as an integrating capacitor) to generate an output voltage that correlates to the voltage across the reference capacitor. The output voltage may be based on the charge of the reference capacitor and on the input charge. Charge amplifiers may be used for application in the readout circuits of optical imaging devices and flat-panel X-ray detector arrays, to measure small charge stored in small capacitors of individual pixels in arrays of pixels.

In multiple-input charge based circuits, selection circuit or multiplexor (MUX) may be used to channel specific sensing capacitors to the charge amplifier for signal processing. The input charge signal, which may be stored in a capacitor for each pixel, may be much less than the error charge induced by parasitic capacitance of the thin film transistor (TFT) selection switch during a transition of the selection switch. As a result, when a pixel is selected, the smaller input charge signal of the pixel may be added to the larger selection-induced error charge, and may cause the charge amplifier to saturate early, thus limiting its dynamic range, or may cause the automatic gain selection circuit to select a lower gain early, thus limiting full advantage of the allowable dynamic range available to sense or amplify the smaller input charge signal. When the selection switch is turned off, the charge amplifier should only represent the input charge signal, but the larger error charge induced by the selection switch may corrupt the output voltage signal.

Thus, there is a need for an improved charge amplifier that compensates for errors without significantly increasing device complexity and size or significantly decreasing performance capabilities.

DETAILED DESCRIPTION

Figure 1:
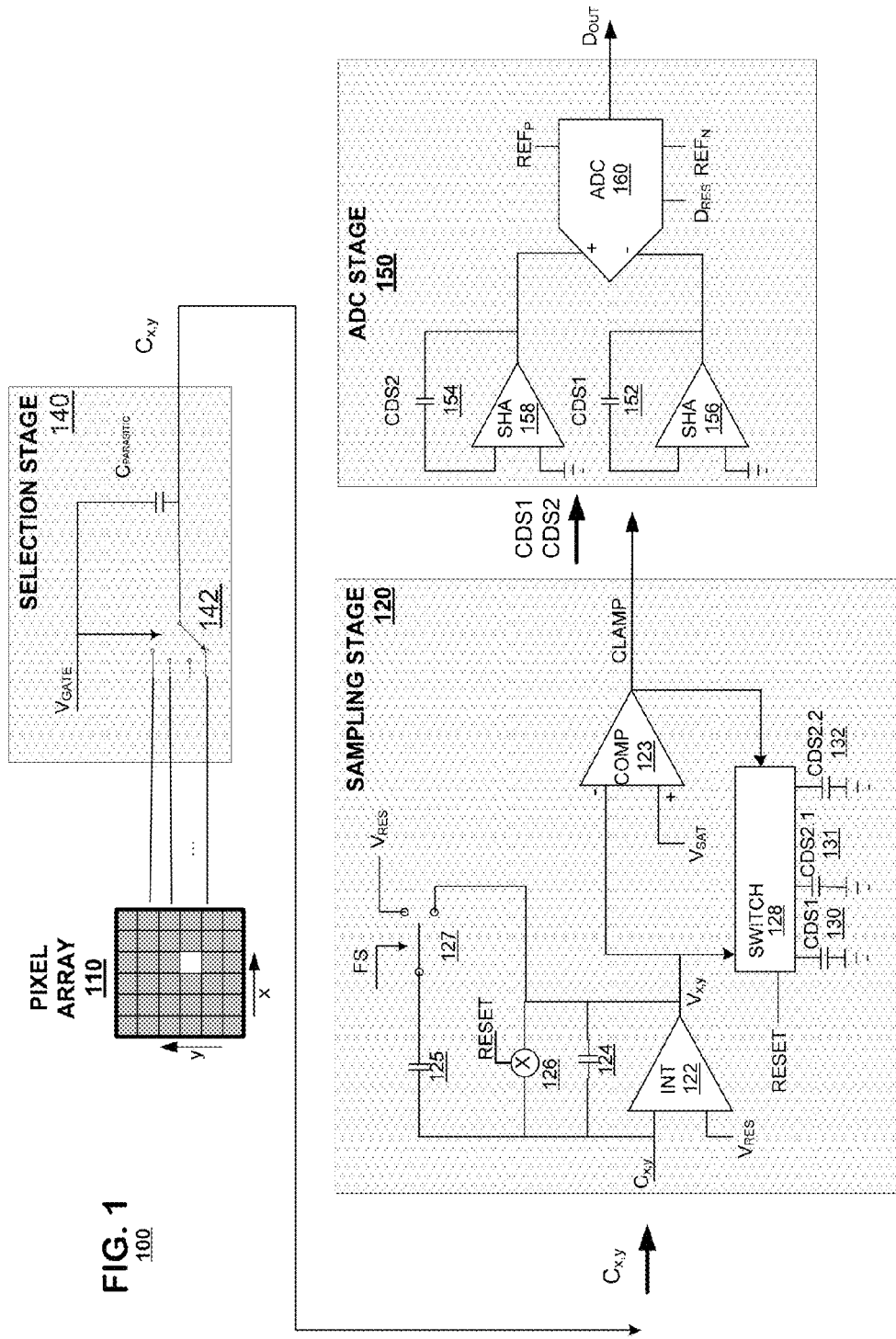
FIG. 1 illustrates a system diagram illustrating a sensor processing system according to an embodiment of the present invention.

FIG. 1 is a sensor processing system 100 according to an embodiment of the present invention. The system 100 may include a variety of circuit systems including a pixel array 110, a sampling stage 120, a selection stage 140, and an ADC stage 150. The pixel array 110 may include a plurality of pixel circuits (not shown) arranged in an ordered array. Pixel circuits within the array may generate output signals that represent radiation incident upon detectors(s) of the circuits, for example, visible light or x-ray radiation. The selection stage 140 may select one of the pixels. When one of the pixels is selected, it may output reset and signal charges separately to the sampling stage 120. The sampling stage 120 may generate output voltages CDS1, CDS2 for use by the ADC stage 150 in digital conversion. The ADC stage 150 may generate a digital output code $D_{OUT}$ representing a signal level of incident radiation to the pixel circuit and, in so doing, may perform sampling operations.

As indicated, the pixel array 110 may include a plurality of pixel elements that generate an electrical output in response to incident energy (e.g., light, x-rays, etc.). Pixel circuits may be organized into a regular array of addressable pixel circuits, for example, in a row of pixels, Cartesian or hexagonal. Each row may have its own sampling stage. For purposes of the present discussion, it is convenient to consider the arrays as including a variety of pixels in columns and rows. Each pixel p(x,y) may include thin film transistor ("TFT") components that may generate a charge when excited by incident radiation. For example, x-rays illuminating on a pixel p(x,y) may generate the charge signal $C_{x,y}$. The amount of illumination may cause a corresponding variation in output charge (i.e., increasing illumination leads to increasing charge).

In an embodiment, the pixel array 110 may be provided on a substrate separate from other components (e.g., sampling stage 120 and ADC stage 150). Such an implementation may be appropriate for an X-ray sensor system. The sampling stage 120 and ADC stage 150 may be provided in a common integrated circuit (IC) to each other. Alternatively, in another embodiment, the pixel array 110 may be provided on a common IC substrate as other components, which may be appropriate in a digital camera embodiment.

The selection stage 140 may include one or more selection switches 142. The selection switches 142 may select one pixel from multiple pixels, based on an addressing signal $V_{GATE}$. When a pixel p(x,y) is addressed, the selection stage 140 may output its corresponding charge signal $C_{x,y}$ to the sampling stage 120. During operation, a selected pixel p(x,y) may be addressed twice for sampling—once immediately after the pixel is reset to output a reset level and a second time after an exposure period to output the signal level. Alternatively, the reset level may be assumed to be at a same stable reference voltage, and thus sampling of the reset level may be skipped. The selection stage 140 may have a parasitic capacitance $C_{PARASITIC}$. The parasitic capacitance $C_{PARASITIC}$ combined with voltage $V_{GATE}$ may be large enough to cause a significant error signal to be generated to impact the sensing of charge signal $C_{x,y}$ of pixel p(x,y).

The sampling stage 120 may include an integrator 122, a comparator 123, a first integrating capacitor 124, a second integrating capacitor 125, reset switch 126, a full-scale (FS) switch 127, switch 128 and sampling capacitors 130, 131, 132. The integrator 122 may have an input coupled to the pixel array 110 via the selection stage 140 and a second input coupled to a resetting voltage $V_{RES}$ (which may be set at for example, 4 v). The comparator 123 may have an input coupled to the output of the integrator 122 and a second input coupled to a saturation threshold voltage $V_{SAT}$ (which may be set at for example, 0.5 v) to determine whether the integrator 122 saturated (i.e. by dropping output below the saturation threshold voltage), generating a CLAMP signal to indicate whether a selected range of the integrator 122 is exceeded. The first integrating capacitor 124 may be coupled to an output and an input of the integrator 122 in feedback configuration. The second integrating capacitor 125 may be coupled to an input of the integrator 122, in series with the FS switch 127, and in parallel with the first integrating capacitor 124. The reset switch 126 may be connected across the first integrating capacitor 124, and may be controlled by a RESET signal to reset it the first integrating capacitor 124. The FS switch 127 may be coupled in series with the second integrating capacitor 125, to be in parallel with the first integrating capacitor 124. The FS switch 127 may be controlled by a FS signal, and in a first state to connect the second integrating capacitor 125 to the output of the integrator 122 (for example, when FS signal is in a high state). The FS switch 127 in a second state may connect the second integrating capacitor 125 to the resetting voltage $V_{RES}$ (for example, when FS signal is in a low state). The switch 128 may be coupled between an output of the integrator 122 and first terminals of the storage capacitors 130, 131, 132. Second terminals of the storage capacitors 130, 131, 132 may be connected to ground. The first terminals of the storage capacitors 130, 131, 132 may be selectively connected by the switch 128 to an output of the sampling stage 120. The switch 128 may be controlled to select the output of the sampling stage 120 from the storage capacitors 130, 131, 132, based upon the RESET signal (for the reset level sampling) and the CLAMP signal from the output of comparator 123.

The sampling stage 120 may receive input charges $C_{x,y}$ from the pixel array 110 at different times for sampling and may sample/accumulate the charge to generate a corresponding input voltage $V_{x,y}$. The samples may be stored as CDS1, CDS2.1, and CDS2.2 on the capacitors 130, 131, 132 respectively. CDS1 may correspond to a sampling time of known conditions (e.g., reset level at reset time), and CDS2.1 and CDS2.2 may correspond to sampling times of unknown conditions (e.g., sensor readings).

The storage capacitors 130, 131, 132 may store the accumulated voltage for samples CDS1, CDS2.1, and CDS2.2 respectively. Typically, the storage capacitors 130, 131, 132 will have common capacitances. Switch 128 may connect the capacitors 130, 131, 132 to input voltage $V_{x,y}$ at appropriate times to capture the CDS1, CDS2.1, and CDS2.2 voltages on the respective capacitors. Furthermore, switch 128 may be controlled to select the output of the sampling stage 120 from the storage capacitors 130, 131, 132, based upon the CLAMP signal from the output of comparator 123. Specifically for example, switch 128 may be controlled to select one of CDS2.1 and CDS2.2 to be CDS2, based upon the CLAMP signal from the output of comparator 123, to be output to ADC stage 150. In other words, the sampling stage 120 may sample the sensor readings at least twice, for example as CDS2.1 and CDS2.2, and then select one of the sensor readings based upon the state of the CLAMP signal indicating whether one of the ranges is saturated.

In an embodiment, the sampling stage 120 may first sample the sensor reading with a wider range, with both integrating capacitors 124 and 125 connected in the feedback loop of the integrator 122, and then sample the sensor reading with a narrower range, with the first integrating capacitor 124 connected but the second integrating capacitor 125 disconnected in the feedback loop of the integrator 122. The first sample, done with greater integrating capacitance, may be selectively stored by switch 128 as CDS2.1 in storage capacitor 131. The second sample, done with less integrating capacitance, may be selectively stored by switch 128 as CDS2.2 in storage capacitor 132. After the two samples, the comparator 123 determines if the second sampling caused integrator 122 to saturate, i.e. if input voltage $V_{x,y}$ dropped below saturation threshold voltage $V_{SAT}$. If saturation occurred at the second sampling, the CLAMP signal may be held high, thus indicating also that the narrower range was exceeded. Subsequently, the switch 128 may select CDS2.1 as CDS2 if saturation occurred in the narrower range, or may select CDS2.2 as CDS2 if saturation did not occur in the narrower range.

Additionally, it is possible that saturation may occur in both the wider range and the narrower range. In such a case, the sensor input signal may be too great, saturation in the wider range may be expected, switch 128 may select either CDS2.1 or CDS2.2 as CDS2, because both signals represent saturated output.

In one embodiment, the sampling stage 120 may detect that saturation occurred in both the wider range and the narrower range, and may force ADC stage 150 to output the digital output code $D_{OUT}$ at a maximum value. The sampling stage 120 may only need to detect that saturation occurred in the wider range, skip sampling in the narrow range, and may force ADC stage 150 to output the digital output code $D_{OUT}$ at a maximum value. The CLAMP signal may be used to in other parts of system 100, for example in ADC stage 150, to generate portion of the digital output code $D_{OUT}$.

By the above described operation, the system 100 may avoid the impact of parasitic capacitance induced error signal and maintain the accuracy of the sensing while dynamically selecting appropriate range for sensing the charge signal on a pixel.

In an embodiment, the ADC stage 150 may include a pair of capacitors 152, 154, a pair of sample and hold amplifiers ("SHA") 156, 158 and a ADC 160. The capacitors 152, 154 each may be provided in feedback configuration about a respective SHA 156, 158. The ADC stage 150 may receive the CDS1 and CDS2 samples from the sampling stage 120 and may convert the difference between the samples, ΔCDS, directly to a digital value in a single conversion operation. The SHAs 156, 158 may buffer CDS1 and CDS2 voltages that are output respectively from the sampling stage 120. A pair of storage capacitors 152, 154 respectively may store the samples CDS1 and CDS2. In an embodiment, the ADC stage storage capacitors 152, 154 and the sampling stage storage capacitors 130, 131, 132 may be provided as common devices.

The input voltage $V_{x,y}$ from the pixel array 110 may vary over several phases of operation. In a first phase, $V_{x,y}$ may be at a reset level representing a voltage of a pixel prior to exposure to incident energy. In another phase, $V_{x,y}$ may be at signal level representing a voltage of the same pixel after having been exposed to incident energy. Other phases may be required to address different pixels within the array.

In an embodiment, sampling in the first phase for the reset level may be skipped, to assume that the reset level is at some predetermined signal level, for example ground voltage level or zero volt. In such case, CDS1 may be assumed to be 0 v, storage capacitor 130 may be omitted, sampling stage 120 may not need to sample or output CDS1, and SHA 156 and storage capacitor 152 may be omitted. ADC stage 150 may perform the digitizing using only CDS2 signal, in reference to a reference signal.

In an embodiment, sampling of CDS2.1 at the wide range may be skipped, to assume that the input from pixel p(x,y) may be small in magnitude. In such a case, sampling stage 120 may connect parallel integrating capacitors 124 and 125 during integration, skip sampling at wide range, disconnect second integrating capacitor 125, and then sample CDS2.2 at narrow range only to output as CDS2. In such a case, storage capacitor 131 may be omitted.

FIG. 1 also illustrates structure of a ADC 160 in an embodiment of the present invention. The ADC 160 may receive the CDS1 voltage from the SHA 156 at a first input terminal (e.g., a negative terminal) and may receive the CDS2 voltage from the CDS2 voltage from the SHA 158 at another input terminal (e.g., a positive terminal). The ADC 160 may generate a digital output code in response to a difference between the CDS1 and CDS2 voltages.

The architecture of FIG. 1, by performing CDS1 to CDS2 comparisons within the ADC, provides an architecture that rejects offsets induced by common path components. As indicated, component variations among the pixel circuits can cause pixel-to-pixel variations in the reset and signal levels that are generated by the pixel array. Further, component variations within the integrator 122 or feedback capacitor 124 can induce signal offsets in the reset and signal levels. The architecture of FIG. 1, by integrating the CDS operation with digitization, rejects signal corruptions that might affect the CDS1 and CDS2 in common.

Alternatively, CDS1 may be assumed at some predetermined voltage level (for example 0 v), and storage capacitor 130, SHA 156, and storage capacitor 152 may be omitted. ADC stage 150 may perform the digitizing using only CDS2 signal, in reference to a reference signal.

Figure 2:
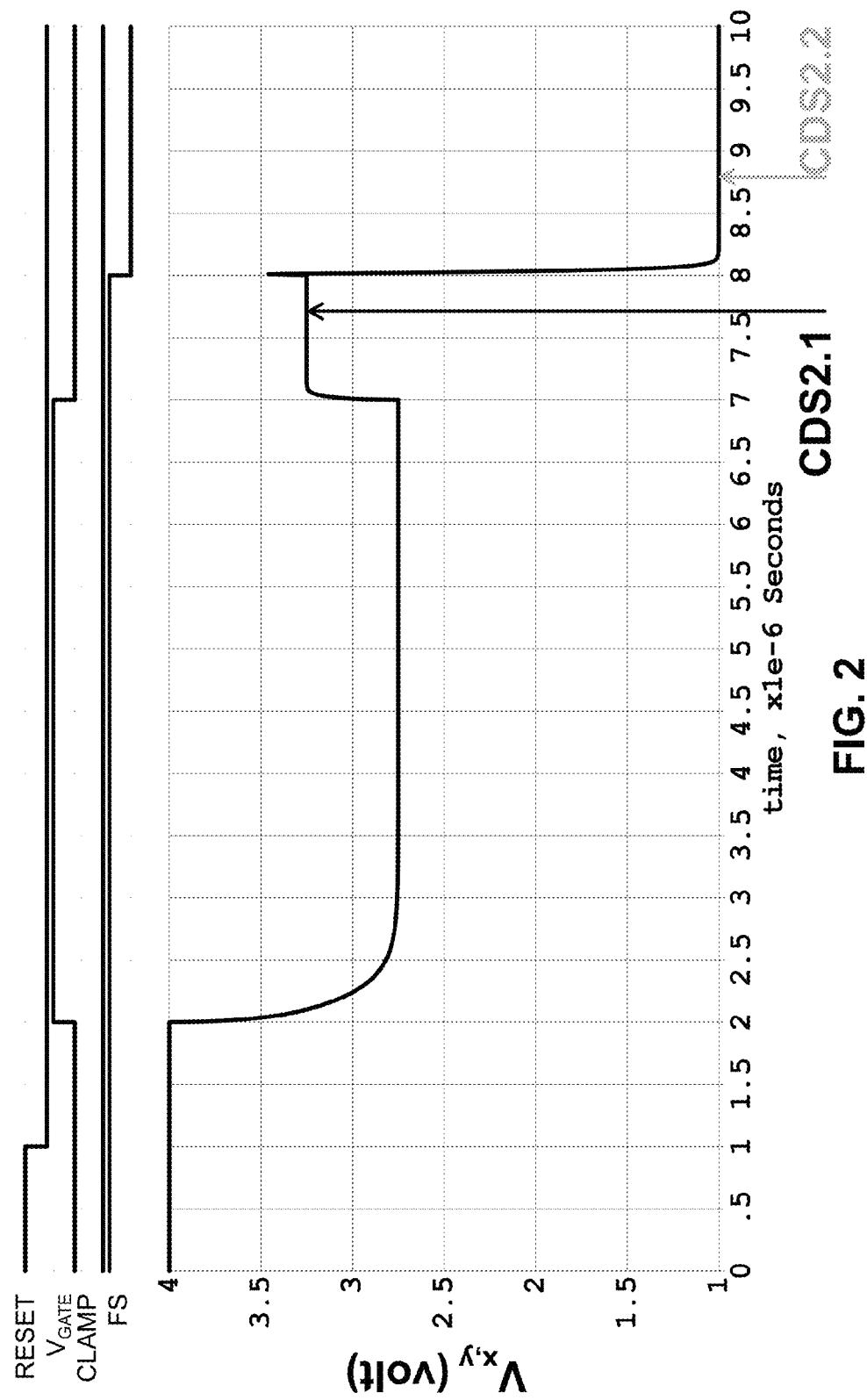
FIG. 2 illustrates a simulated timing diagram of signals during operation of the system according to an embodiment of the present invention.

FIG. 2 illustrates a simulated timing diagram of signals during operation of the system 100 according to an embodiment.

Assuming in for example, in FIG. 1, one pixel of charge has a capacitance of 1 picofarad (pF), and the resetting voltage $V_{RES}$ is 4 volts (v), which represents a zero signal. At time 0, a pixel charge signal for pixel p(x,y) may be (4.75−4.0)*1 pF=0.75 pico-coulomb (pC). At time 0, reset switch 126 may be on, FS switch 127 may be on, thus shorting integration capacitors 124 and 125, and forcing input voltage $V_{x,y}$ at output of integrator 122 to 4 v.

At time of 1 microsecond (μsec), (or at some predetermined time before sensing) reset switch 126 may turn off by changing RESET signal state in preparation for sensing.

At time of 2 μsec, (or at some predetermined time set for start sensing) addressing signal $V_{GATE}$ may turn on selection switches 142 to select the pixel p(x,y) above. As charge is transferred from pixel p(x,y), the integrator 122 may integrate the charge and the input voltage $V_{x,y}$ at output of integrator 122 may decrease proportional to the charge signal for pixel p(x,y).

When the selection switches 142 turns on, the parasitic capacitance $C_{PARASITIC}$ may inject some error charge into the charge signal $C_{x,y}$. In this example, assume that when the selection switches 142 turn on, 0.5 pC of error charge may be injected into the charge signal $C_{x,y}$. The charge signal $C_{x,y}$ may increase to (0.75 pC+0.5 pC)=1.25 pC.

When the selection switches 142 turn on, the integrator 122 may begin to integrate by transferring the 1.25 pC of the charge signal $C_{x,y}$ to both integrating capacitors 124 and 125 (in the wide range), where first integrating capacitor 124 may have capacitance of 0.25 pF and the second integrating capacitor 125 may have capacitance of 0.75 pF. The total integrating capacitance from the two integrating capacitors 124 and 125 may be 1 pF. As the charge signal $C_{x,y}$ of 1.25 pC transfers to the two integrating capacitors 124 and 125, input voltage $V_{x,y}$ at output of integrator 122 settles toward (4 v−1.25 pC/1 pF)=2.75 v.

At time of 7 μsec, (or after some predetermined duration after start of sensing) when the selection switches 142 turn off, the error charge effect may be considered to be removed. The charge signal $V_{x,y}$ may be considered to be returning to 0.75 pC for sensing purposes. As a result, the input voltage $V_{x,y}$ at output of integrator 122 settles toward (4 v−0.75 pC/1 pF)=3.25 v.

At time of approximately 7.75 μsec, (or after some predetermined duration after turning off the selection switches 142) switch 128 may selectively channel and store the input voltage $V_{x,y}$ of 3.25 v onto storage capacitor 131, as CDS2.1.

At time of 8 μsec, (or after some predetermined duration after turning off the selection switches 142 and/or after sampling CDS2.1) FS switch 127 may turn off as signal FS goes low. This disconnects the second integrating capacitor 125 from the feedback loop of the integrator 122. As a result, the total integrating capacitance of the integrator 122 may be decreased to 0.25 pF of the first integrating capacitor 124. The charge signal $C_{x,y}$ may be considered to be remaining at 0.75 pC for sensing purposes. As a result, the input voltage $V_{x,y}$ at output of integrator 122 settles toward (4 v−0.75 pC/0.25 pF)=1 v.

At time of approximately 8.75 μsec, (or after some predetermined duration after turning off FS switch 127) switch 128 may selectively channel and store the input voltage $V_{x,y}$ of 1 v onto storage capacitor 132, as CDS2.2.

Throughout the above sequence and after, the comparator 123 compares the input voltage $V_{x,y}$ to the saturation threshold voltage $V_{SAT}$ (which may be set at for example, 0.5 V). Because the input voltage $V_{x,y}$ never drops below the saturation threshold voltage $V_{SAT}$ of 0.5 v, the signal CLAMP may be low, indicating that the integrator 122 did not saturate in either the wider range or the narrow range. As a result, the switch 128 may select CDS2.2 of 1 v on storage capacitor 132 to output to ADC stage 150 as signal CDS2. ADC stage 150 then may digitize the difference between CDS1 and CDS2 to generate digital output code $D_{OUT}$, while also taking into account the signal CLAMP indicating the range of the sensing.

By the above described operation, the system 100 may avoid the impact of parasitic capacitance induced error signal and maintain the accuracy of the sensing while dynamically selecting appropriate range for sensing the charge signal on a pixel.

Figure 3:
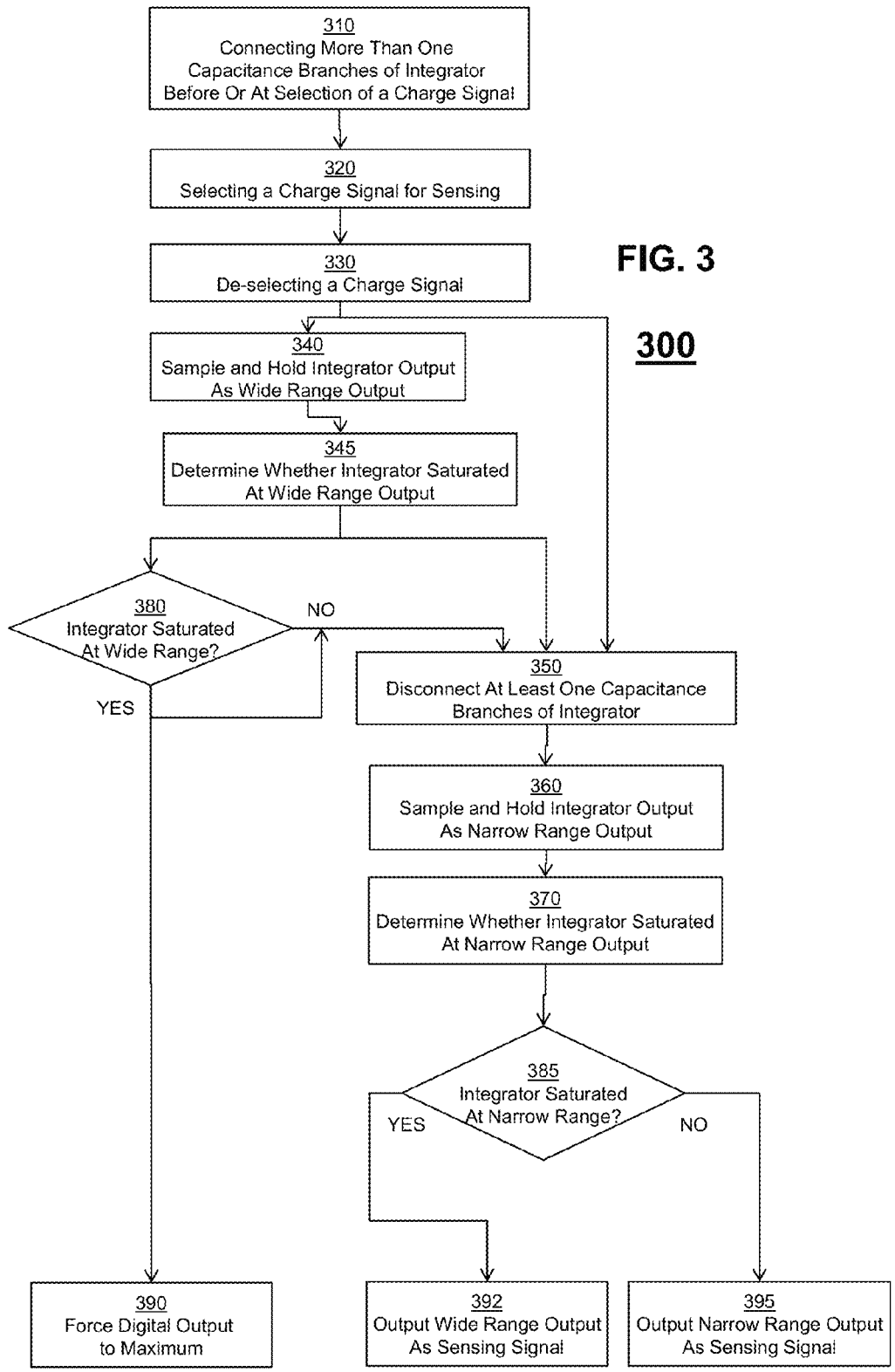
FIG. 3 illustrates a method according to an embodiment of the present invention.

FIG. 3 illustrates a method 300 according to an embodiment of the present invention.

At block 310, more than one capacitance branches of an integrator may be connected before or at the time of selection of a charge signal.

At block 320, a charge signal may be selected for sensing.

At block 330, the charge signal may be de-selected.

At block 340, the system may sample and hold the stabilized output of the integrator as a wide range output.

At block 345, the system may determine if the integrator saturated at the wide range output by, for example, comparing the wide range output to a predetermined or preset threshold voltage.

In one embodiment, the system may proceed from block 345 to block 350.

In one embodiment, the system may proceed from block 345 to blocks 350 and 380 in parallel.

In one embodiment, the system may skip blocks 340 and 345, i.e. skip sampling at wide range, and proceed to block 350.

In one embodiment, at block 380, if the integrator saturated in wide range, proceed to block 390, the system may force the digital output to a maximum value.

In one embodiment, at block 380, regardless of if integrator saturated in wide range, proceed to block 350.

At block 350, the system may disconnect at least one capacitance branches of the integrator.

At block 360, the system may sample and hold the stabilized output of the integrator as a narrow range output.

At block 370, the system may determine if the integrator saturated at the narrow range output by, for example, comparing the narrow range output to a predetermined or preset threshold voltage.

At block 385, if the integrator saturated in narrow range, proceed to block 392, otherwise, proceed to block 395.

At block 392, the system may output the wide range output of the integrator as the sensing signal.

At block 395, the system may output the narrow range output of the integrator as the sensing signal.

By the above described method, the system 100 may avoid the impact of parasitic capacitance induced error signal and maintain the accuracy of the sensing while dynamically selecting an appropriate range for sensing the charge signal on a pixel.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A system, comprising:
    a pixel array generating a plurality of output signals respectively representing radiation incident upon and stored as respective pixel charges of individual pixels in the pixel array;
    a selector selecting an output signal of the plurality of the output signals; and
    a sampler comprising a charge integrator that generates a voltage based on the pixel charge stored onto the selected pixel of the pixel array and based on a feedback capacitance of the charge integrator, wherein the charge integrator obtains a pixel charge of the selected output signal of a particular pixel onto a first feedback capacitance to produce a first sample at an output of the charge integrator, and then redistributes that pixel charge from the first feedback capacitance to a smaller second feedback capacitance to produce a second sample at the output of the charge integrator.

2. The system of claim 1, further comprising a converter generating a digital signal based upon the selected output signal.

3. The system of claim 1,
    wherein the charge integrator comprises an amplifier with a feedback path connecting an output of the amplifier to an input of the amplifier.

4. The system of claim 1,
    wherein the charge integrator comprises an amplifier with a feedback path connecting an output of the amplifier to an input of the amplifier, the feedback path controlled to channel the first feedback capacitance or the second feedback capacitance.

5. The system of claim 1, comprising an analog-to-digital converter that determines which of the first and second samples to use for conversion into a digital value based at least in part on whether the second sample saturates the output of the charge integrator.

6. The system of claim 1,
    wherein the sampler comprises a switch controlling a feedback path in the charge integrator to channel the first feedback capacitance or the second feedback capacitance.

7. The system of claim 1,
    wherein the sampler obtains a reset sample before obtaining the first sample, and stores the reset sample as a voltage signal in a capacitor.

8. The system of claim 1,
    wherein the sampler stores the first sample and the second sample as voltage signals in a plurality of capacitors.

9. A method, comprising:
    generating, by a pixel array, a plurality of output signals representing radiation incident upon and stored as respective pixel charges of individual pixels in the pixel array;
    selecting, by a selector, an output signal of the plurality of the output signals; and
    sampling, by a sampler, the selected output signal,
    wherein the sampler comprises a charge integrator that generates a voltage based on the pixel charge stored onto the selected pixel of the pixel array and based on a feedback capacitance of the charge integrator, wherein the charge integrator obtains the pixel charge of the selected output signal onto a first feedback capacitance to produce a first sample at an output of the charge integrator, and then redistributes that pixel charge from the first feedback capacitance to a smaller second feedback capacitance to produce a second sample at the output of the charge integrator.

10. The method of claim 9, further comprising generating, by a converter, a digital signal based upon the selected output signal.

11. The method of claim 9,
    wherein the charge integrator comprises an amplifier with a feedback path connecting an output of the amplifier to an input of the amplifier.

12. The method of claim 9,
    wherein the charge integrator comprises an amplifier with a feedback path connecting an output of the amplifier to an input of the amplifier, the feedback path controlled to channel the first feedback capacitance or the second feedback capacitance.

13. The method of claim 9,
    wherein the sampler comprises a switch controlling a feedback path in the charge integrator to channel the first feedback capacitance or the second feedback capacitance.

14. The method of claim 9,
    wherein the sampler obtains a reset sample before obtaining the first sample, and stores the reset sample as a voltage signal in a capacitor.

15. The method of claim 9,
    wherein the sampler stores the first sample and the second sample as voltage signals in a plurality of capacitors.

16. The system of claim 9, comprising determining which of the first and second samples to use for conversion into a digital value based at least in part on whether the second sample saturates the output of the charge integrator.

17. A non-transitory computer readable medium storing computer program instructions, executable by a processor to control a system to perform:
    generating, by a pixel array; a plurality of output signals that representing radiation incident upon and stored as respective pixel charges of individual pixels in the pixel array;
    selecting, by a selector, an output signal of the plurality of the output signals; and
    sampling, by a sampler, the selected output signal, wherein the sampler comprises a charge integrator that generates a voltage based on the pixel charge stored onto the selected pixel of the pixel array and based on a feedback capacitance of the charge integrator, wherein the charge integrator obtains pixel charge of the selected output signal onto a first feedback capacitance to produce a first sample at an output of the charge integrator, and then redistributes that pixel charge from the first feedback capacitance to a smaller second feedback capacitance to produce a second sample at the output of the charge integrator.

18. The non-transitory computer readable medium of claim 17, wherein the system further performs generating, by a converter, a digital signal based upon the one of the plurality of the output signals selected output signal.

19. The non-transitory computer readable medium of claim 17,
    wherein the charge integrator comprises an amplifier with a feedback path connecting an output of the amplifier to an input of the amplifier.

20. The non-transitory computer readable medium of claim 17,
    wherein the charge integrator comprises an amplifier with a feedback path connecting an output of the amplifier to an input of the amplifier, the feedback path controlled to channel the first feedback capacitance or the second feedback capacitance.

21. The non-transitory computer readable medium of claim 17,
wherein the sampler comprises a switch controlling a feedback path m the charge integrator to channel the first feedback capacitance or the second feedback capacitance.

22. The non-transitory computer readable medium of claim 17,
wherein the sampler obtains a reset sample before obtaining the first sample, and stores the reset sample as a voltage signal in a capacitor.

23. The non-transitory computer readable medium of claim 17, storing computer program instructions, executable by a processor to control a system to perform determining which of the first and second samples to use for conversion into a digital value based at least in part on whether the second sample saturates the output of the charge integrator.

\* \* \* \* \*

UNITED STATES PATENT AND TRADEMARK OFFICE
CERTIFICATE OF CORRECTION

PATENT NO. : 9,584,747 B2
APPLICATION NO. : 14/012154
DATED : February 28, 2017
INVENTOR(S) : Huin et al.

It is certified that error appears in the above-identified patent and that said Letters Patent is hereby corrected as shown below:

In Column 10, Line 37, in Claim 17, delete "array;" and insert --array,-- therefor In Column 11, Line 7, in Claim 21, delete "m" and insert --in-- therefor Signed and Sealed this
Seventeenth Day of April, 2018

Andrei Iancu
*Director of the United States Patent and Trademark Office*